Feb. 4, 1930.  W. RÜHLING  1,746,130
DEVICE FOR MEASURING AVERAGE VELOCITY FOR AN APPRECIABLE LENGTH OF TIME
Filed Nov. 20, 1925
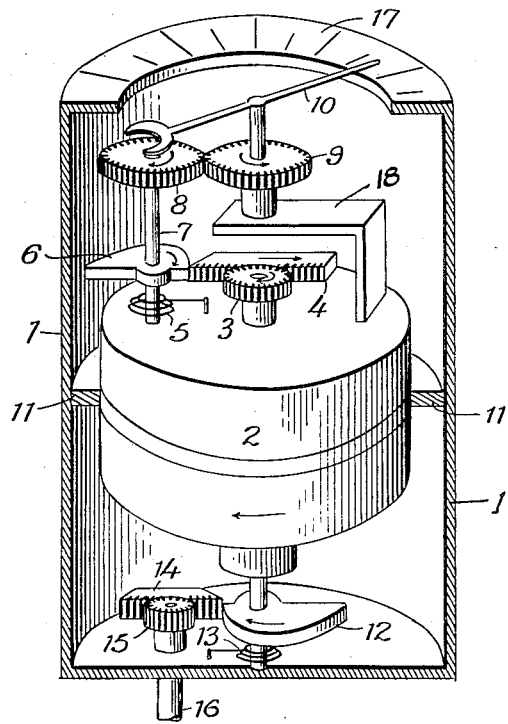
Inventor
Waldemar Rühling
By Alexander Dowd
Attorneys Patented Feb. 4, 1930

1,746,130

UNITED STATES PATENT OFFICE

WALDEMAR RÜHLING, OF DRESDEN, GERMANY

DEVICE FOR MEASURING AVERAGE VELOCITY FOR AN APPRECIABLE LENGTH OF TIME

Application filed November 20, 1925, Serial No. 70,327, and in Germany November 27, 1924.

Measuring devices for determining average velocity have been heretofore constructed, the general principle of same depending upon a time-train and distance-train, working with a logarithmic relationship on a common lever or axis (for example by a differential gear) and by this means indicating mediately or immediately the average velocity. The disadvantage of the above arrangement is that the time-train is unfavourably influenced by the distance-train, because the revolving moment of the distance-train either by checking or accelerating affects that of the time-train. This influence not only causes an inexact progress of the time-train but also its cessation as soon as the driving power (revolving velocity) of the distance-train is correspondingly increased.

The present invention depends upon the time-train itself moving an indicator in logarithmic relationship, the indicator itself having no mediate or immediate connection with the distance-train, so that the distance-train also has no effect or influence upon the indicator of the time-train or its progress.

According to my invention, the entire time-train, or its scale, is revolved by the distance-train on its own proper axis, whereby the average velocity is shown by the indicator of the time-train.

The arrangement of this invention is illustrated in the drawing.

In the casing 1 is a time-train 2 which actuates the indicator 10 in logarithmic intervals by means of a known crank gear, for example by means of a gear 3 mounted on the time-train shaft, meshing with a rack 4, one end of which engages a cam 6 mounted on a shaft 7, whereby when the rack 4 is moved backwards and forwards the cam 6 will be rotated correspondingly. On shaft 7 is a gear 8 meshing with a gear 9 on the shaft of pointer 10 carried by an arm 18 mounted directly upon member 2, which pointer cooperates with the scale 17. A spring 5 tends to rotate shaft 7 in a direction to maintain cam 6 in constant contact with the end of rack 4.

The time-train 2 is capable of revolving in the collar 11 of casing 1, around its own proper axis by means of a second crank gear consisting of a gear 15 mounted on a shaft 16, said gear meshing with a rack 14 one end of which engages a cam 12 mounted on the time-train shaft whereby as the rack 14 is reciprocated the cam 12 will be rotated correspondingly. A spring 13 tends to maintain the cam 12 in constant contact with the end of rack 14, similarly to spring 5. This second crank gear is arranged in connection with the drive shaft 16 of a rotating member and actuates the time train 2 in logarithmic relationship of the distance.

The directions of rotation of the indicator 10 and the time-train 2 are arranged oppositely, so that the indicator 10 will show the difference in the revolving-movements since $$\log d - \log t = \log \frac{d}{t} \text{ (average velocity)};$$

$d$ representing distance traversed and $t$ representing the time elapsed.

On the correspondingly graduated dial 17, the average velocity is consequently shown immediately by the indicator 10.

In place of time-train 2 any other desired driving device, for example an electric motor or the like with a definite number of revolutions per minute, may be employed.

If the time-train 2 is fixedly arranged for attaining the same object, the scale 17 must be arranged to revolve in the same way and with the same media as previously described for the time-train 2.

I claim:

1. An average velocity measuring device comprising a casing; a time-train rotatably mounted in the casing; a dial; a pointer cooperating with said dial; means driven by the time-train for moving the pointer through logarithmic intervals; a distance train; and means driven thereby for rotating the time-train through logarithmic intervals whereby the pointer will move over said dial in accordance with the difference of said logarithmic intervals.

2. A velocity measuring device comprising a driving member; a time train; a dial; a pointer cooperating with the dial; means operated by the time train for moving the pointer through logarithmic intervals; and means operated by the driving member for rotating the time train through logarithmic intervals in a direction opposite that imparted to the pointer arm by the time train.

3. In a device as set forth in claim 2, a rotatable casing housing said time train; and said driving member rotating the casing.

WALDEMAR RÜHLING.